United States Patent [19]
Johnson et al.

[11] Patent Number: 5,719,351
[45] Date of Patent: Feb. 17, 1998

[54] ANTI-RUPTURE METHOD FOR LIQUID PROPELLANT GAS INFLATOR

[75] Inventors: Darrin L. Johnson, Fountain Hills, Ariz.; Bradley D. Harris, Farmington, Utah

[73] Assignee: Morton International, Inc., Chicago, Ill.

[21] Appl. No.: 770,382

[22] Filed: Dec. 3, 1996

[51] Int. Cl.$^6$ ............................................. B60R 21/26
[52] U.S. Cl. ........................... 102/440; 102/530; 280/737; 280/741
[58] Field of Search ..................... 102/530, 531, 102/440; 280/741, 737

[56] References Cited

U.S. PATENT DOCUMENTS

| | | | |
|---|---|---|---|
| 3,618,974 | 11/1971 | Chute | 280/150 AB |
| 3,689,105 | 9/1972 | Matsui et al. | 280/150 AB |
| 3,690,255 | 9/1972 | Vass et al. | 102/39 |
| 3,960,390 | 6/1976 | Goetz | 280/731 |
| 4,326,377 | 4/1982 | Jaqua | 60/247 |
| 5,060,973 | 10/1991 | Giovanetti | 280/736 |
| 5,330,730 | 7/1994 | Brede et al. | 280/737 |
| 5,345,876 | 9/1994 | Rose et al. | 102/531 |
| 5,487,561 | 1/1996 | Mandzy et al. | 280/741 |

*Primary Examiner*—Stephen M. Johnson
*Attorney, Agent, or Firm*—Corinne R. Gorski; Gerald K. White

[57] ABSTRACT

An inflator of a vehicle safety restraint system includes a housing having a reservoir of liquid propellant. A combustion chamber is disposed in the housing in communication with the liquid propellant reservoir. A regenerative piston is movably disposed within the housing for separating the liquid propellant reservoir and the combustion chamber. The piston head includes a plurality of injection ports for delivering the liquid propellant to the combustion chamber in a controlled manner. A pressure relieving bore, normally sealed by the piston stem, is disposed in the housing for relieving pressure in the liquid propellant reservoir. Decomposition or combustion within the propellant storage reservoir will move the piston to open the pressure relief bore which depressurizes the liquid propellant and prevents rupture and fragmentation of the inflator.

6 Claims, 5 Drawing Sheets

ANTI-RUPTURE METHOD FOR LIQUID PROPELLANT GAS INFLATOR

This application is related to copending applications Ser. No. 08/770,380, entitled "Injection Termination Feature"; Ser. No. 08/760,011, entitled "Regenerative Piston Liquid Propellant Rocket Motor"; Ser. No. 08/781,760, entitled "Liquid Propellant Inflator Having a Crowned Encapsulation and a Pre-formed Regenerative Piston Chamber"; Ser. No. 08/768,146, entitled "Regenerative Piston Engine For Combustion of Liquid Monopropellant"; Ser. No. 08/802,457, entitled "Adaptive Regenerative Inflator"; Ser. No. 08/759,995, entitled "Regenerative Monopropellant Airbag Inflator"; all assigned to the assignee of the present invention.

BACKGROUND OF THE INVENTION

1. Field of the Invention

The present invention relates to a liquid propellant gas generator or inflator of a vehicle safety restraint system, and more particularly, to an inflator which includes controlled means for relieving pressure in the inflator due to combustion and decomposition reactions of the liquid propellant, preventing rupture and fragmentation of the inflator. 2. Description of the Related Art It is known in the prior art to employ an inflatable vehicle safety restraint system for protecting a passenger of an automobile. Such restraint systems encompass a reaction canister which houses a gas generator or inflator, and an air bag in an uninflated condition. For actuating the inflator, an inflator initiator or squib, which comprises an electro-explosive device, starts the material of the inflator burning. The inflator initiator is connected to a collision sensor that is positioned adjacent the initiator or at a remote location in the vehicle.

Numerous different types of inflators have been disclosed in the prior art for expanding an inflatable air bag. One type of inflator utilizes a quantity of high pressure gas stored in a storage cylinder or body, which is selectively released to inflate the air bag. Another type of inflator derives the gas source from a combustible gas generating material, which, upon ignition, generates a quantity of hot gas for inflating the air bag. In still another type, the inflator includes both stored compressed gas and gas generating material for inflating the air bag.

A drawback to an airbag which utilizes compressed gas, is that the gas may leak out over long periods of time. If the gas pressure of the bottle falls below a predetermined level due to an undetected gas leak, the airbag effectiveness would degrade and the system will not operate properly. Solid propellants generate toxic by-products and particulate that must be filtered from the gas. The filters necessary to remove these toxic by-products increase the size and weight of the inflators increasing manufacturing costs.

Still another type of inflator is one that utilizes a liquid propellant for producing the inflation gas. Liquid propellant does not require pressurized storage. Another advantage is that the liquid propellant is favorable to the environment and the gas it generates does not need to be filtered prior to release. However, the choice of materials for containing the liquid propellant is limited due to the corrosive nature of the propellant. Also, liquid propellant is sensitive to contamination.

U.S. Pat. No. 5,060,973 discloses an inflator for an occupant restraint safety apparatus which utilizes a liquid propellant for generating the air bag inflation gas. U.S. Pat. No. 5,487,561 discloses an inflator also utilizing a liquid propellant, wherein a piston separates a combustion chamber from a reservoir of the liquid propellant. The piston is driven by combustion to deliver the liquid propellant through ports in the piston head into the combustion chamber.

A disadvantage with the above liquid propellant inflators is that when combustion or decomposition occurs within the stored liquid propellant, the inflator may burst from the resulting rapid pressurization. A standard approach for relieving excess pressure would be to provide a burst disk which only ruptures at pressures above standard operating pressures, but ruptures at pressures below chamber burst. Such a solution adds costs and complexity and the rate of decomposition and/or combustion at pressures above the operating pressure is so high that known means of effective pressure relief are not practical.

SUMMARY OF THE INVENTION

An object of the present invention is to prevent explosion and fragmentation of a liquid inflator by relieving the pressure by controlled means. The regenerative piston of the present invention will travel in a reverse direction when exposed to pressure within the propellant storage reservoir until an opening is formed at the bore which supports the piston shaft.

Another object of the present invention is to prevent any catastrophic results due to bonfire exposure, contamination of the liquid propellant, loss of hermetic seal of the propellant, or reversal of the combustion process which ignites the stored propellant during operation In accomplishing these and other objectives of the present invention, there is provided an inflator of a vehicle safety restraint system including a housing having a reservoir of liquid propellant. A combustion chamber is disposed in the housing in communication with the liquid propellant reservoir. Regenerative piston means are movably disposed within the housing for separating the liquid propellant reservoir and the combustion chamber. The piston means including a plurality of injection ports for delivering the liquid propellant to the combustion chamber in a controlled manner. Pressure relieving means are disposed in the housing for relieving pressure in the liquid propellant reservoir due to combustion and decomposition reactions of the liquid propellant.

A swirl retainer surrounding the combustion chamber and the head of the piston abuts against the swirl retainer. The pressure relief means comprises a bore in the housing through which the piston stem extends.

In one embodiment, the swirl retainer includes an upper section and a lower section connected therewith via a frangible joint, wherein when combustion or decomposition occurs within the liquid propellant reservoir the resulting high pressure will move the piston against the swirl retainer breaking the upper and lower sections of the swirl retainer along the frangible joint, and sliding the upper section into the lower section, allowing the piston to move in a direction opposite normal operation to open the bore in the housing and relieve the pressure in the inflator.

In another embodiment, the swirl retainer includes a plurality of grooves along a length thereof, wherein when combustion or decomposition occurs within the liquid propellant reservoir the resulting high pressure will move the piston against the swirl retainer peddling sides of the swirl retainer inwardly to collapse the swirl retainer.

In still another embodiment, the swirl retainer includes a plurality of fingers along a lower portion thereof, wherein when combustion or decomposition occurs within the liquid propellant reservoir the resulting high pressure will move the piston against the swirl retainer, the fingers will expand allowing the swirl retainer to slide over the swirl tube.

Other features and advantages of the present invention will become apparent from the following description of the invention which refers to the accompanying drawings.

DETAILED DESCRIPTION OF THE PREFERRED EMBODIMENTS

Figure 1:
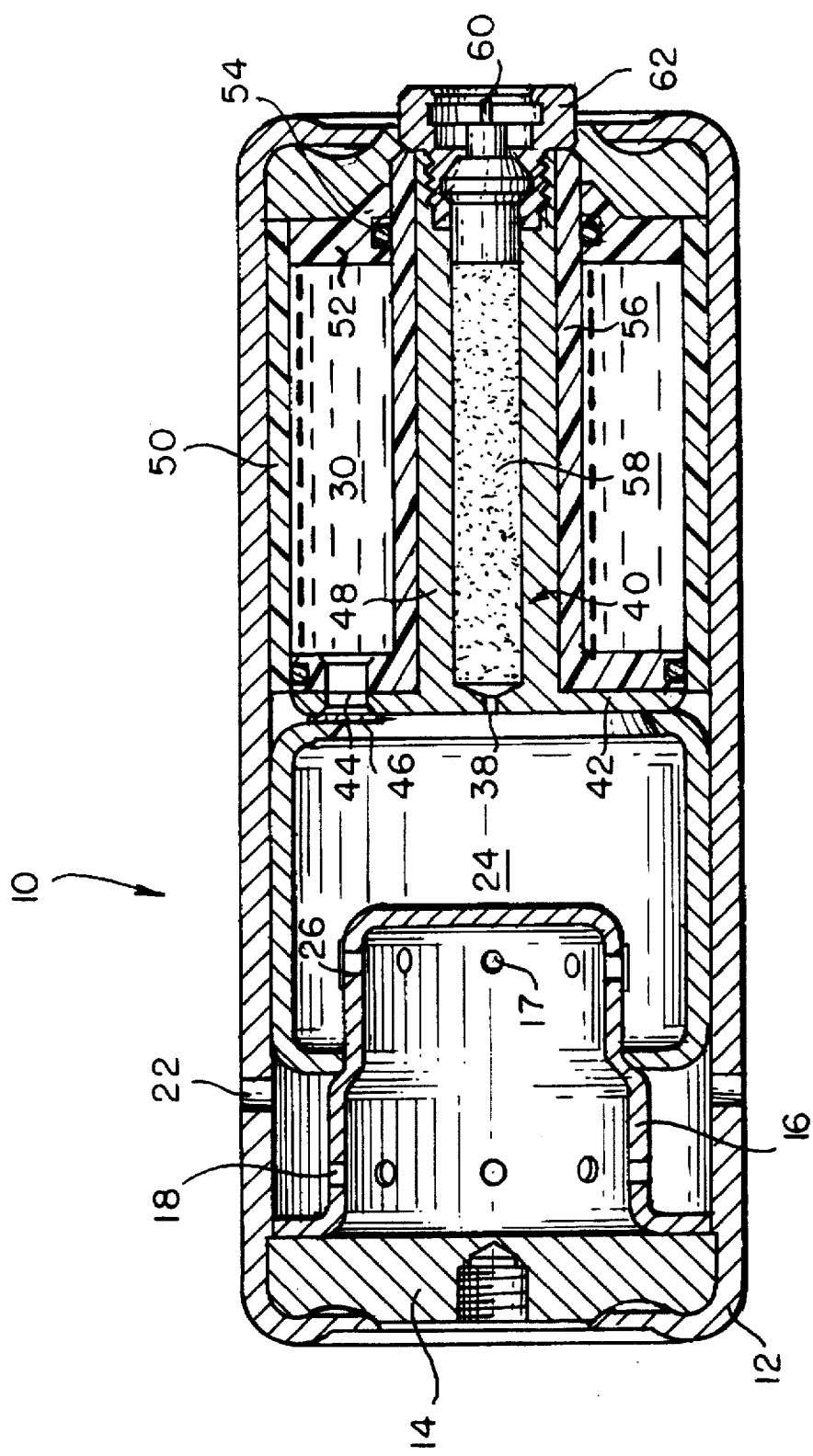
FIG. 1 is a cross-sectional view of an inflator incorporating pressure relief means according to a first embodiment of the present invention.

Referring to FIG. 1, an inflator for deploying an air bag (not shown) of a vehicle safety restraint system is indicated by reference numeral 10. The gas generating material of inflator 10 is a liquid propellant, such as Han/Tean (90 gm). Inflator 10 includes a housing 12 made of a lightweight material, for example aluminum. Located in one end of housing 12 is a swirl tube 16 and an end cap or base stud 14 which seals that end of housing 12. Swirl tube 16 includes an upper portion which is enclosed within a swirl retainer 20, which will be described further herein.

Swirl tube 16 includes a plurality of gas entry apertures 17 and a plurality of gas exit apertures 18 which communicate with exit ports 22 disposed in housing 12. As will be described further herein, generated gas enters swirl tube 16 via entry apertures 17. Once within swirl tube 16, the generated gas circulates and cools before exiting through exit apertures 18. Exit apertures 18 can be radially or tangentially cut, depending upon the mass flow and speed desired. As previously mentioned, the generated gas exits the swirl tube into the housing and then out of the inflator through exit ports 22.

Swirl retainer 20, in addition to separating apertures 17 and 18, also encloses a combustion chamber 24, which contains a suitable gas, for example, air. As will be described further herein, chamber 24 is pressurized during combustion.

As shown in the drawing figures, housing 12 is divided into combustion chamber 24 and a liquid propellant chamber or reservoir 30. Chamber 24 and reservoir 30 are separated by a regenerative piston 40 having a piston head or face 42 which is slidably received within an encapsulation cup 50. Piston head 42 includes a plurality of injection ports 44, sealed with a burst foil 46, for providing fluid communication between combustion chamber 24 and liquid propellant reservoir 30. Piston 40 can be made of a material which deactivates the propellant, i.e., a metal or plastic.

Encapsulation 50 can be made of a material which can withstand the corrosive effects of the liquid propellant, for example, Teflon, thus protecting housing 12 from direct contact with the liquid propellant. Piston head 42 is received within encapsulation 50 tightly enough to prevent seepage of the liquid propellant from the reservoir, but with head 42 still able to slide within encapsulation 50. If necessary sealing means, for example, an o-ring can also be provided to prevent leakage. Encapsulation cup 50 includes a base 52. Base 52 acts as an insert seal and can be made of Teflon coated aluminum. Stem 48 is slidingly received through base 52 and can be sealed therewith via an o-ring 54 or other equivalent means.

Piston 40 also includes a stem 48 which extends through reservoir 30. To prevent corrosion of stem 48 is provided with a lining 56. Lining 56 is an anti-corrosive material, for example, Teflon or fluorocarbon. Stem 48 is hollow to accommodate ignitor material 58. Piston head 42 includes a central bore 38 at one end between ignitor material 58 and combustion chamber 24. The opposite end of stem 48 includes a squib 60 mounted therein via a connecting insert 62.

During normal operation upon firing of squib 60, material 58 is ignited and the gas exits port 38 causing a combustion reaction in chamber 24. The increased pressure in chamber 24 bursts foil 46 covering injection ports 44 and drives the piston head against the liquid propellant and an initial quantity of the liquid propellant is delivered to the combustion chamber 24 through ports 44. This initial quantity of liquid propellant combusts causing the pressure within chamber 24 to increase further. The energy generated by the combustion of the initial quantity is used to drive the piston further into the liquid propellant reservoir and additional liquid propellant is injected into the combustion chamber. Upon bursting of foil 46, the generated gas enters swirl tube 16 via entry apertures 17 and exits through apertures 18 and ports 22 of housing 12.

As the piston is driven further against the liquid propellant more gas is generated as the liquid propellant is displaced. This regenerative cycle provides controlled burning of the liquid propellant, and prevents quick burning of the propellant which can result in explosion of the inflator.

If, however, the liquid propellant combusts or rapidly decomposes, the inflator may burst from the resulting rapid pressurization. Combustion or decomposition of the liquid propellant can occur due to bonfire exposure, contamination of the liquid propellant, loss of hermetic seal of the liquid propellant, or reversal of the combustion process which ignites the stored propellant.

Figure 2:
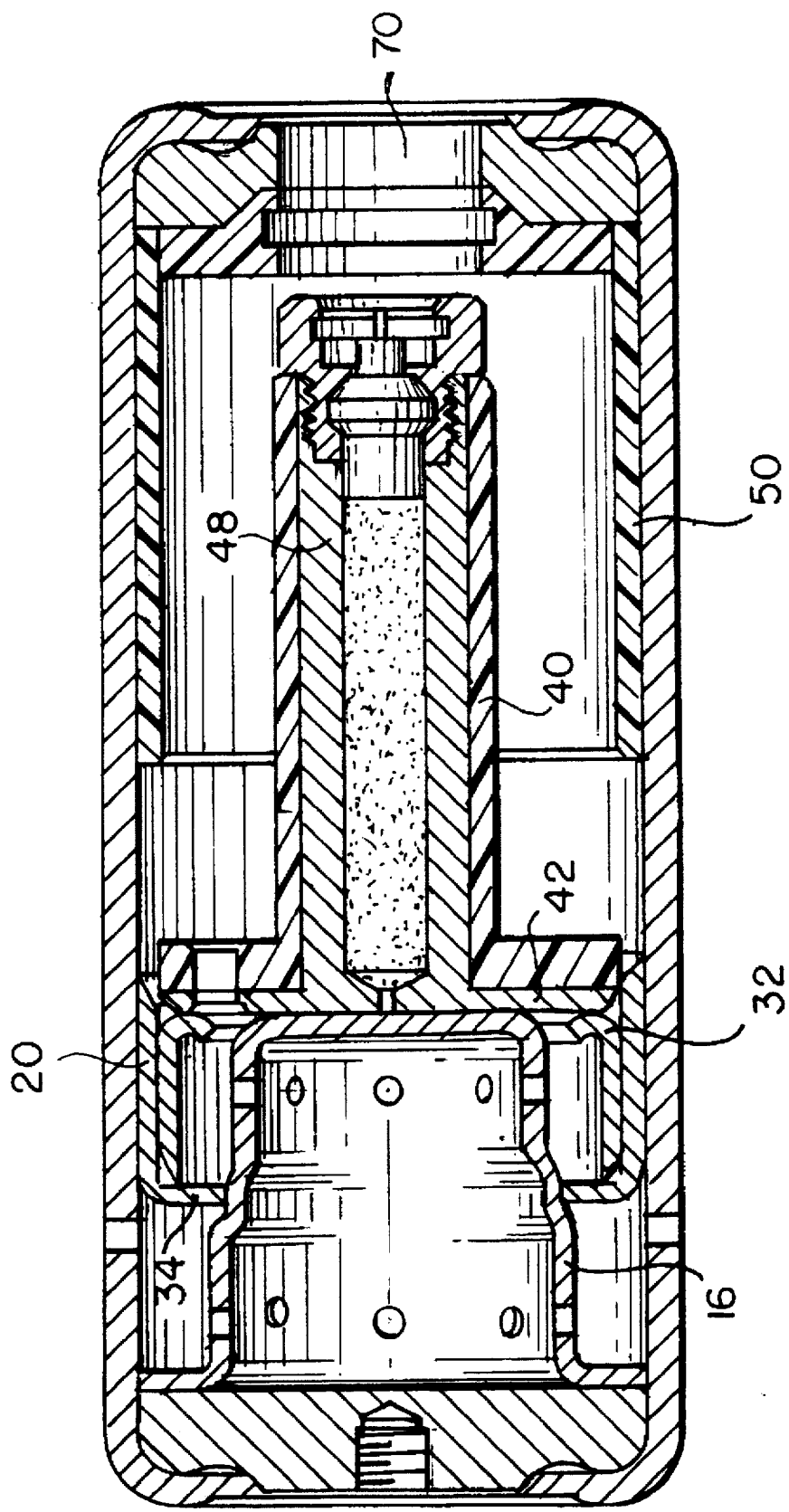
FIG. 2 is a cross-section of the inflator of FIG. 1 after pressure relief of the inflator.

The present invention utilizes means for preventing explosion and fragmentation of the inflator. As shown in FIG. 2, piston 40 can move in a direction opposite that of normal operation, to open a pressure relief bore 70 which depressurizes the liquid propellant and prevents rupture and fragmentation of the inflator. Ira high liquid propellant pressure occurs without a balanced combustion chamber pressure, the piston will move to open the relief bore.

Figure 3A:
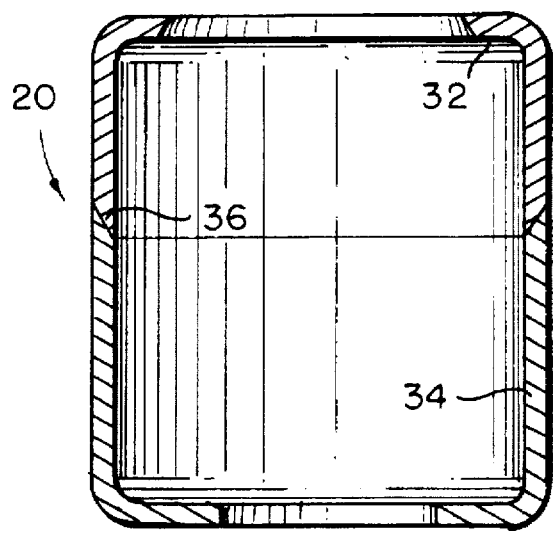
FIGS. 3A and 3B illustrate the swirl retainer of FIGS. 1 and 2.
Figure 3B:
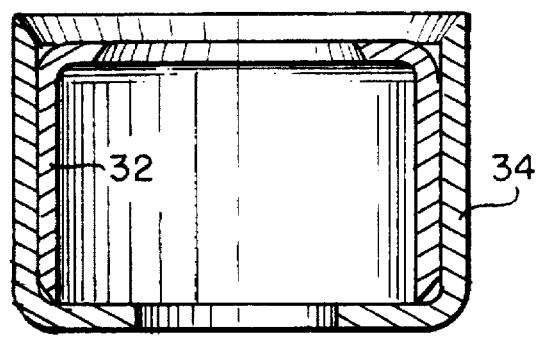

Referring to FIGS. 2–3B, swirl retainer 20 includes an upper section 32 and a lower section 34 attached along frangible scored line 36. When exposed to pressure within propellant chamber 30, piston 40 will travel in a reverse direction, leftward as shown in FIG. 2. As piston 40 moves in this direction, piston head 42 will abut upper section 32 of swirl retainer 20, sections 32 and 34 will separate along line 36 and upper section 32 will slide inward into lower section 34, see FIG. 3B. As piston head 42 collapses upper section 32 of retainer 20 into lower section 34, opening 70 is formed at the bore which supports piston stem 48. When bore 70 is formed, the liquid pressure will be relieved and thus rapid combustion or decomposition will cease prior to bursting of the inflator.

Figure 4:
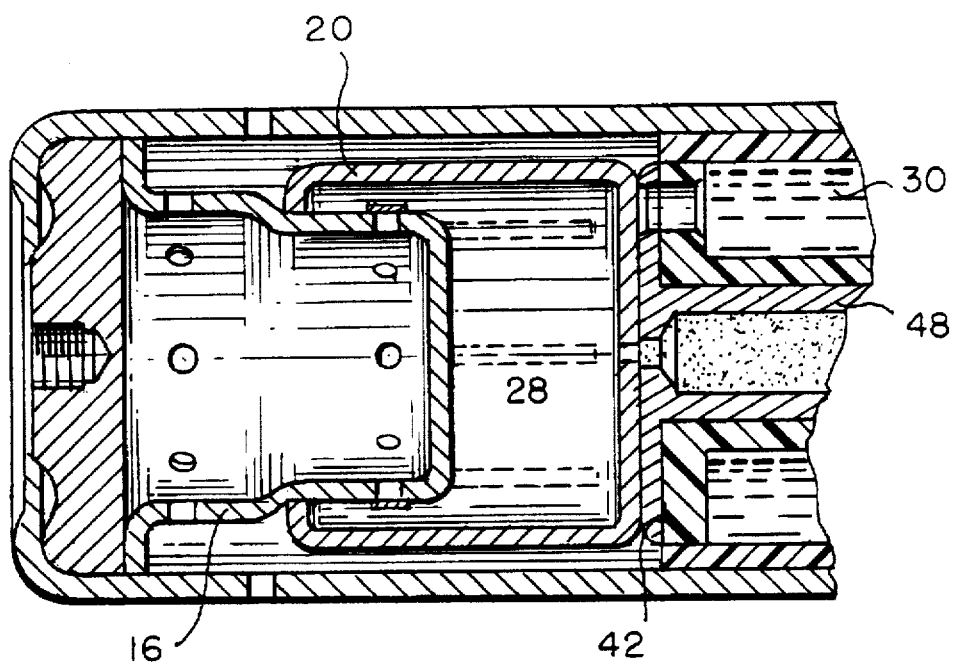
FIGS. 4 and 5 are partial cross-sections of an inflator incorporating pressure relief means according to a second embodiment of the present invention.
Figure 5:
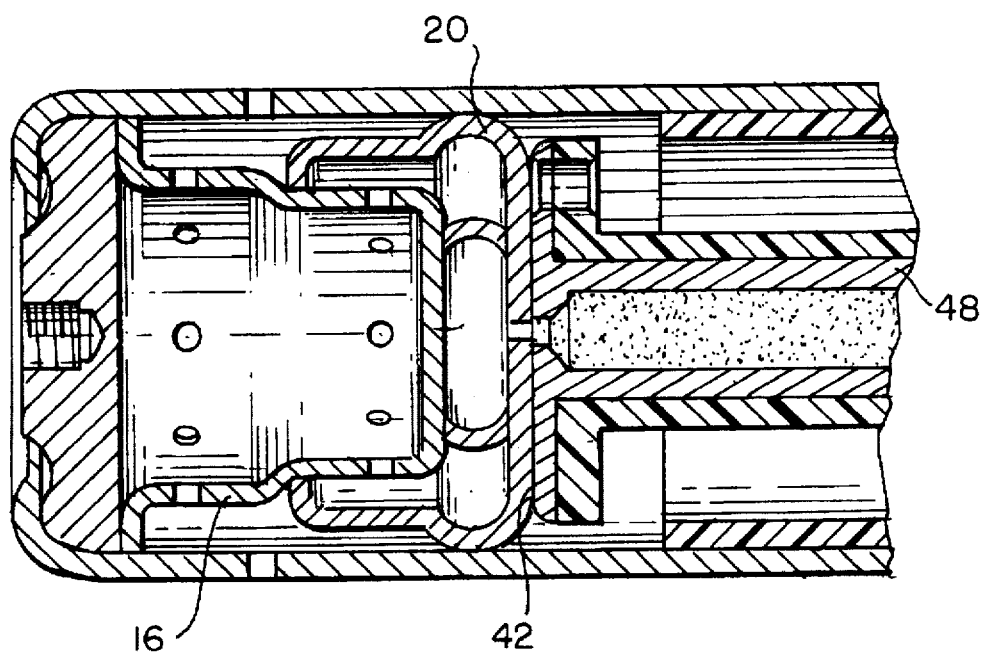

In the embodiment of FIGS. 4 and 5, swirl retainer 20 is of a single piece and includes grooves 28 along the length thereof. If pressure was to increase within liquid propellant reservoir 30, piston head 42 will move against retainer 20 and the walls of the retainer will peddle inward as shown in FIG. 5, bore 70. The pressure at which the retainer will peddle depends upon the amount of grooving, i.e., the greater the amount of grooving the lower the pressure to release.

Figure 6:
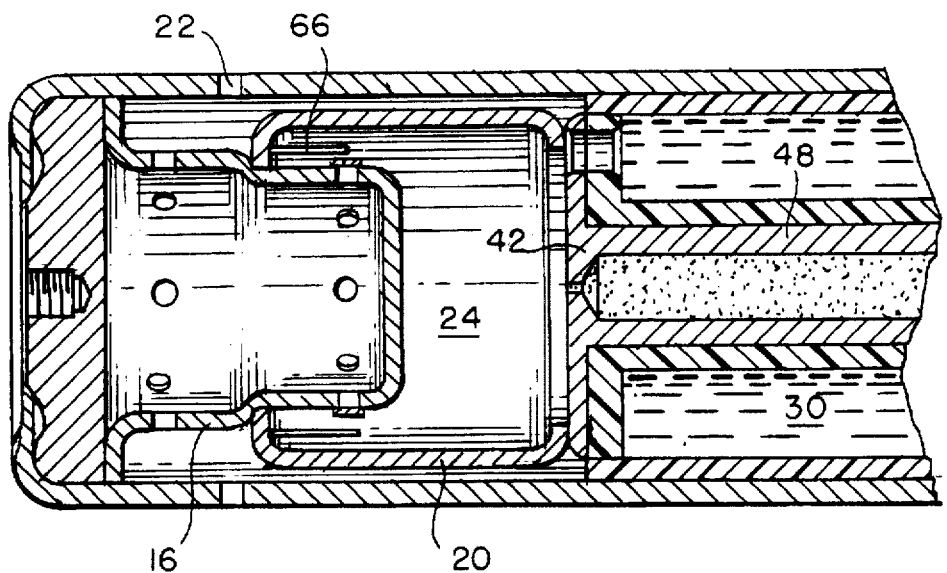
FIGS. 6 and 7 are partial cross-sections of an inflator incorporating pressure relief means according to a third embodiment of the present invention.
Figure 7:
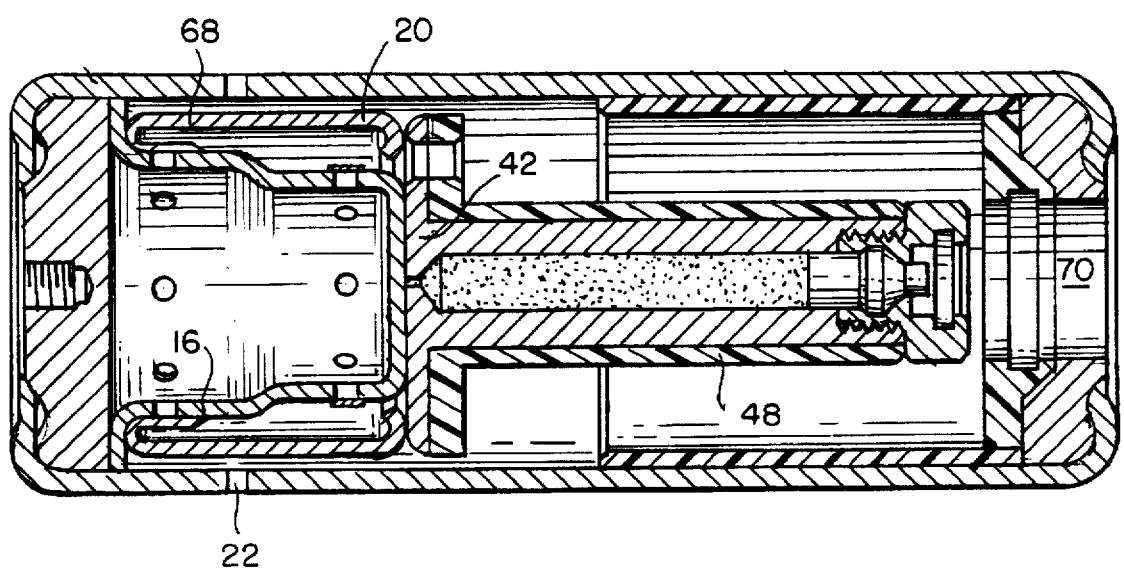

FIGS. 6 and 7 illustrate a third embodiment of the present invention. As shown in FIG. 6, swirl retainer 20 includes frangible grooves 66 which separate the lower section of the retainer into attached fingers 68. As the pressure increases in chamber 30, piston head 42 moves against retainer 20, fingers 68 expand and the swirl retainer slides over swirl chamber 16, allowing piston 40 into move in a direction to open bore 70 and relieve the pressure. Swirl retainer 20 is designed to withstand normal operating combustion pressures and to separate combustion chamber 24 from the volume interior to port 22 during operation.

Thus, the present invention solves the problem of inflator rupture and fragmentation by providing a controlled pressure relief for the propellant storage reservoir. By allowing piston movement in a direction opposite that of normal operation, the propellant within the storage chamber creates a pressure relief valve.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An inflator of a vehicle safety restraint system, comprising:

a housing, the housing including a reservoir of liquid propellant;

a combustion chamber disposed in the housing in communication with the liquid propellant reservoir;

a swirl retainer located within and enclosing the combustion chamber;

regenerative piston means movably disposed within the housing for separating the liquid propellant reservoir and the combustion chamber, the piston means including a head separating the combustion chamber from the liquid propellant reservoir and a piston stem extending through the housing, the piston head including a plurality of injection ports for delivering the liquid propellant to the combustion chamber in a controlled manner; and pressure relieving means disposed in the housing for relieving pressure in the liquid propellant reservoir due to combustion and decomposition reactions of the liquid propellant.

2. The inflator of claim 1, wherein the pressure relief means comprises a bore in the housing through which the piston stem extends.

3. The inflator of claim 2, wherein the piston head abuts against the swirl retainer.

4. An inflator of a vehicle safety restraint system, comprising:

a housing, the housing including a reservoir of liquid propellant;

a combustion chamber disposed in the hosing in communication with the liquid propellant reservoir;

a swirl retainer enclosing the combustion chamber, the swirl retainer including an upper section and a lower section connected therewith via a frangible joint;

regenerative piston means movably disposed within the housing for separating the liquid propellant reservoir and the combustion chamber, the piston means comprising a piston including a head separating the combustion chamber from the liquid propellant reservoir and a piston stem extending through the housing, the piston head including a plurality of injection ports for delivering the liquid propellant to the combustion chamber in a controlled manner; and pressure relieving means disposed in the housing for relieving pressure in the liquid propellant reservoir due to combustion and decomposition reactions of the liquid propellant, the pressure relieving means comprising a bore in the housing through which the piston stem extends, wherein when combustion or decomposition occurs within the liquid propellant reservoir the resulting high pressure will move the piston against the swirl retainer breaking the upper and lower sections of the swirl retainer along the frangible joint, and sliding the upper section, allowing the piston to move in a direction opposite normal operation to open the bore in the housing and relieve the pressure in the inflator.

5. An inflator of a vehicle safety restraint system, comprising:

a housing, the housing including a reservoir of liquid propellant;

a combustion chamber disposed in the housing in communication with the liquid propellant reservoir;

a swirl retainer located within and enclosing the combustion chamber, the swirl retainer including a plurality of grooves along a length thereof;

regenerative piston means movably disposed within the housing for separating the liquid propellant reservoir and the combustion chamber, the piston means comprising a piston including a head separating the combustion chamber from the liquid propellant reservoir and a piston stem extending through the housing, the piston head including a plurality of injection ports for delivering the liquid propellant to the combustion chamber in a controlled manner; and pressure relieving means disposed in the housing four relieving pressure in the liquid propellant reservoir due to combustion and decomposition reactions of the liquid propellant, the pressure relieving means comprising a bore in the housing through which the piston stem extends, wherein when combustion or decomposition occurs within the liquid propellant reservoir the resulting high pressure will move the piston against the swirl retainer peddling sides of the swirl retainer inwardly to collapse the swirl retainer allowing the piston to move in a direction opposite normal operation to open the bore in the housing and relieve the pressure in the inflator.

6. An inflator of a vehicle safety restraint system, comprising:

a housing, the housing including a reservoir of liquid propellant;

a combustion chamber disposed in the housing in communication with the liquid propellant reservoir;

a swirl tube disposed in the housing in communication with the combustion chamber;

a swirl retainer located within and enclosing the combustion chamber, the swirl retainer including a plurality of fingers along a lower portion thereof;

regenerative piston means movably disposed within the housing for separating the liquid propellant reservoir and the combustion chamber, the piston means comprising a piston including a head separating the combustion chamber from the liquid propellant reservoir and a piston stem extending through the housing, the piston head including a plurality of injection ports for delivering the liquid propellant to the combustion chamber in a controlled manner; and pressure relieving means disposed in the housing for relieving pressure in the liquid propellant reservoir due to combustion and decomposition reactions of the liquid propellant, the pressure relieving means comprising a bore in the housing through which the piston stem extends, wherein when combustion or decomposition occurs within the liquid propellant reservoir the resulting high pressure will move the piston against the swirl retainer, the fingers will expand allowing the swirl retainer to slide over the swirl tube, allowing the piston stem to move in a direction opposite normal operation to open the bore in the housing and relieve the pressure in the inflator.

* * * * *